US009240084B2

(12) United States Patent
Vardi et al.

(10) Patent No.: US 9,240,084 B2
(45) **Date of Patent: *Jan. 19, 2016**

(54) ELEVATOR SYSTEM PREVENTING UNAUTHORIZED USE

(71) Applicant: TECHIP INTERNATIONAL LIMITED, Larnaca (CY)

(72) Inventors: Eyal Dov Vardi, Bet Nir (IL); Dov Ehrman, Jerusalem (IL)

(73) Assignee: TECHIP INTERNATIONAL LIMITED, Nicosia (CY)

( * ) Notice: Subject to any disclaimer, the term of this patent is extended or adjusted under 35 U.S.C. 154(b) by 0 days.

This patent is subject to a terminal disclaimer.

(21) Appl. No.: 14/703,028

(22) Filed: May 4, 2015

(65) Prior Publication Data

US 2015/0235489 A1 Aug. 20, 2015

Related U.S. Application Data

(63) Continuation of application No. 13/741,937, filed on Jan. 15, 2013, now Pat. No. 9,064,391, which is a continuation-in-part of application No. 13/331,648, filed on Dec. 20, 2011, now Pat. No. 8,736,447.

(51) Int. Cl.
*G05B 19/00* (2006.01)
*G07C 9/00* (2006.01)

(52) U.S. Cl.
CPC .................................. *G07C 9/00007* (2013.01)

(58) Field of Classification Search
CPC ........... H01L 2224/78301; H01L 2924/10253; H01L 2924/00; H01L 2924/00014; H01L 2924/01019; H01L 2924/01087; G01P 15/0891; G01P 1/127; G08B 21/0261; G08B 21/0275; G08B 21/0288; G08B 21/22; G08B 13/24
USPC ....................... 340/5.6, 568.1–568.2, 539.13, 340/572.1–572.9, 568.6, 568.8, 571, 686.6, 340/691.6, 692
See application file for complete search history.

(56) References Cited

U.S. PATENT DOCUMENTS

| | | | |
|---|---|---|---|
| 4,598,275 | A | 7/1986 | Ross et al. |
| 4,819,860 | A | 4/1989 | Hargrove et al. |
| 5,014,040 | A | 5/1991 | Weaver et al. |
| 5,075,670 | A | 12/1991 | Bower et al. |
| 5,204,670 | A | 4/1993 | Stinton |
| 5,216,909 | A | 6/1993 | Armoogam |
| 5,218,344 | A | 6/1993 | Ricketts |
| 5,298,884 | A | 3/1994 | Glimore et al. |

(Continued)

FOREIGN PATENT DOCUMENTS

| | | |
|---|---|---|
| DE | 3049091 A1 | 7/1982 |
| GB | 2465849 A | 6/2010 |

(Continued)

OTHER PUBLICATIONS

Office Action issued in U.S. Appl. No. 13/331,648 dated Aug. 23, 2013.

*Primary Examiner* — Daniel Previl
(74) *Attorney, Agent, or Firm* — Nixon & Vanderhye P.C.

(57) ABSTRACT

A tamper alert band is provided that includes a strap with conductive and non-conductive elements or layers. The tamper alert band includes an electronic or RFID device that is configured to communicate with RFID readers and/or exciters. The strap may be a single unitary body that has a conductive layer and a non-conductive layer.

11 Claims, 11 Drawing Sheets

(56) References Cited

U.S. PATENT DOCUMENTS

| | | | |
|---|---|---|---|
| 5,589,840 | A | 12/1996 | Fujisawa |
| 5,742,256 | A | 4/1998 | Wakabayashi |
| 5,977,877 | A | 11/1999 | McCulloch et al. |
| 6,104,295 | A | 8/2000 | Gaisser et al. |
| 6,112,563 | A | 9/2000 | Ramos |
| 6,218,945 | B1 | 4/2001 | Taylor, Jr. |
| 6,225,906 | B1 * | 5/2001 | Shore ......................... 340/573.4 |
| 6,236,319 | B1 | 5/2001 | Pitzer et al. |
| 6,305,605 | B1 | 10/2001 | Goetz et al. |
| 6,424,264 | B1 | 7/2002 | Giraldin et al. |
| 6,472,989 | B2 | 10/2002 | Roy, Jr. |
| 6,529,136 | B2 | 3/2003 | Cao et al. |
| 6,727,817 | B2 | 4/2004 | Maloney |
| 6,747,562 | B2 | 6/2004 | Giraldin et al. |
| 6,753,782 | B2 | 6/2004 | Power |
| 6,813,916 | B2 | 11/2004 | Chang |
| 6,853,304 | B2 | 2/2005 | Reisman et al. |
| 6,888,502 | B2 | 5/2005 | Beigel et al. |
| 6,963,277 | B2 | 11/2005 | Imasaki et al. |
| 6,998,984 | B1 | 2/2006 | Zittrain et al. |
| 7,030,765 | B2 | 4/2006 | Giraldin et al. |
| 7,084,764 | B2 | 8/2006 | McHugh et al. |
| 7,098,792 | B1 | 8/2006 | Ahlf et al. |
| 7,114,647 | B2 | 10/2006 | Giraldin et al. |
| 7,123,141 | B2 | 10/2006 | Contestabile |
| 7,132,944 | B1 | 11/2006 | Kron et al. |
| 7,151,445 | B2 | 12/2006 | Medve et al. |
| 7,158,030 | B2 | 1/2007 | Chung |
| 7,239,238 | B2 | 7/2007 | Tester et al. |
| 7,240,446 | B2 | 7/2007 | Bekker |
| 7,242,306 | B2 | 7/2007 | Wildman et al. |
| 7,256,681 | B1 | 8/2007 | Moody et al. |
| 7,312,709 | B2 | 12/2007 | Kingston |
| 7,324,000 | B2 | 1/2008 | Zittrain et al. |
| 7,327,251 | B2 | 2/2008 | Corbett, Jr. |
| 7,355,514 | B2 | 4/2008 | Medve et al. |
| 7,374,081 | B2 | 5/2008 | Mosher, Jr. |
| 7,382,268 | B2 | 6/2008 | Hartman |
| 7,468,666 | B2 | 12/2008 | Ciarcia, Jr. et al. |
| 7,479,891 | B2 | 1/2009 | Boujon |
| 7,498,943 | B2 | 3/2009 | Medve et al. |
| 7,554,446 | B2 | 6/2009 | Ciarcia, Jr. et al. |
| RE41,171 | E | 3/2010 | Howe, Jr. |
| 7,701,332 | B2 | 4/2010 | Anderson |
| 7,714,725 | B2 | 5/2010 | Medve et al. |
| 7,994,916 | B2 | 8/2011 | Kron et al. |
| 8,001,235 | B2 | 8/2011 | Russ et al. |
| 8,138,886 | B1 | 3/2012 | Chang |
| 8,185,411 | B2 | 5/2012 | Allard et al. |
| 8,416,081 | B2 | 4/2013 | Kron et al. |
| 8,736,447 | B2 | 5/2014 | Ehrman et al. |
| 9,064,391 | B2 * | 6/2015 | Vardi et al. |
| 2002/0035484 | A1 | 3/2002 | McCormick |
| 2002/0070865 | A1 | 6/2002 | Lancos et al. |
| 2002/0075151 | A1 | 6/2002 | Lancos et al. |
| 2002/0097159 | A1 * | 7/2002 | Hooglander ............... 340/573.1 |
| 2003/0174059 | A1 | 9/2003 | Reeves |
| 2004/0080421 | A1 | 4/2004 | Wunderlich |
| 2004/0172222 | A1 * | 9/2004 | Simpson et al. .............. 702/189 |
| 2004/0174264 | A1 | 9/2004 | Reisman et al. |
| 2005/0240441 | A1 | 10/2005 | Suzuki et al. |
| 2006/0089538 | A1 | 4/2006 | Cuddihy et al. |
| 2006/0218626 | A1 * | 9/2006 | Goehler ............................ 726/5 |
| 2007/0017136 | A1 | 1/2007 | Mosher et al. |
| 2007/0116036 | A1 | 5/2007 | Moore |
| 2007/0194099 | A1 | 8/2007 | Miller et al. |
| 2008/0028654 | A1 | 2/2008 | Cardon et al. |
| 2008/0057976 | A1 | 3/2008 | Rae et al. |
| 2008/0126126 | A1 | 5/2008 | Ballai |
| 2008/0126417 | A1 | 5/2008 | Mazurik |
| 2008/0211677 | A1 | 9/2008 | Shecter |
| 2009/0203971 | A1 | 8/2009 | Sciarappa et al. |
| 2009/0224889 | A1 | 9/2009 | Aggarwal et al. |
| 2010/0001838 | A1 * | 1/2010 | Miodownik et al. ......... 340/10.1 |
| 2010/0089108 | A1 | 4/2010 | Dutt et al. |
| 2010/0174229 | A1 | 7/2010 | Hsu et al. |
| 2010/0238033 | A1 | 9/2010 | Blumel et al. |
| 2011/0025852 | A1 | 2/2011 | Tanaka |
| 2011/0050411 | A1 | 3/2011 | Schuman et al. |
| 2011/0111736 | A1 | 5/2011 | Dalton et al. |
| 2011/0127325 | A1 | 6/2011 | Hussey et al. |
| 2011/0128145 | A1 | 6/2011 | Todd et al. |
| 2011/0266343 | A1 | 11/2011 | Liu |
| 2012/0050532 | A1 | 3/2012 | Rhyins |
| 2012/0086573 | A1 | 4/2012 | Bischoff et al. |
| 2012/0160613 | A1 * | 6/2012 | Friedli .................. B66B 5/0012 187/384 |
| 2013/0069514 | A1 | 3/2013 | Hashemi et al. |
| 2013/0121658 | A1 | 5/2013 | Kiet et al. |
| 2013/0182382 | A1 | 7/2013 | Vardi et al. |

FOREIGN PATENT DOCUMENTS

| | | |
|---|---|---|
| JP | 2004-46582 | 2/2004 |
| WO | WO 2008-144952 | 12/2008 |

* cited by examiner

ELEVATOR SYSTEM PREVENTING UNAUTHORIZED USE

CROSS-REFERENCES TO RELATED APPLICATIONS

This application is a continuation of U.S. application Ser. No. 13/741,937, filed Jan. 15, 2013 which is a continuation-in-part of U.S. application Ser. No. 13/331,648, filed Dec. 20, 2011, (now U.S. Pat. No. 8,736,447), the entire contents of each being herein and hereby incorporated by reference. The contents of grandparent application Ser. No. 13/331,648 were previously incorporated by reference in the immediate parent application Ser. No. 13/741,937, and are now presented in full below. The entire contents of immediate parent application Ser. No. 13/741,937 are now incorporated by reference in this present application.

FIELD

The present invention relates generally to tamper-resistant monitoring systems and methods.

BACKGROUND

The following patent publications are believed to represent the current state of the art:

U.S. Pat. Nos. 5,204,670 and 7,158,030; and

U.S. Published Patent Application Nos.: 2004/0174264 and 2011/0050411.

SUMMARY

The present invention seeks to provide improved tamper-resistant monitoring systems and methods.

There is thus provided in accordance with a preferred embodiment of the present invention a system for monitoring residents of a health care facility including a plurality of a tamper-resistant resident monitoring devices, each of the devices being uniquely associated with a resident of the facility, a multiplicity of device detectors operative to communicate with the monitoring devices and a computer subsystem operative to communicate with the plurality of tamper-resistant resident monitoring devices via the multiplicity of device detectors, and to thereby monitor the residents of the facility.

Preferably, the monitoring devices are operative to monitor locations of the residents. Preferably, the monitoring devices are operative to monitor health-related parameters of the residents. Preferably, the health-related parameters include heart rate and blood oxygen levels.

Preferably, the computer subsystem resides on a computer server connected to an enterprise-wide network. Preferably, the enterprise-wide network connects between a plurality of systems for monitoring residents of health care facilities.

In accordance with a preferred embodiment of the present invention the monitoring devices are operable to be worn by the residents.

Preferably, the system also includes door controllers operable for controlling magnetic door locking mechanisms which are associated with doors of the facility. Preferably, the system also includes resident location authorization functionality operative to ascertain whether a resident of the facility is authorized to open a particular door of the facility. Preferably, the locking mechanisms are operative to lock or unlock the doors responsive to signals received from the resident location authorization functionality via the door controllers.

Preferably, the resident location authorization functionality is also operative to ascertain whether a resident of the facility is authorized to operate any of the elevators of the health care facility and to employ an elevator control system of the health care facility to prevent operating of the elevators by residents who are not authorized to operate the elevators. Preferably, the resident location authorization functionality is also operative to employ the elevator control system to allow operating of the elevators by residents who are not authorized to operate the elevators when the residents are accompanied by authorized personnel of the health care facility.

In accordance with a preferred embodiment of the present invention the monitoring devices include a wristband and a monitoring portion. Preferably, the wristband is tamper-resistantly connected to the monitoring portion. Preferably, the wristband is formed of an electrically conductive material and is galvanically connected to the monitoring portion, thereby creating an electrical circuit through the wristband and the monitoring portion. Preferably, the electrically conductive material includes a conductive thermoplastic elastomer.

In accordance with a preferred embodiment of the present invention the monitoring device is operative, upon opening of the electrical circuit caused by breaching of the wristband or disconnecting of the wristband from the monitoring portion of the monitoring device, to send a tampering signal to the computer subsystem via at least one of the device detectors, the tampering signal indicating that the monitoring device has been tampered with. Preferably, the computer subsystem is operative, responsive to receiving the tampering signal from the monitoring device, to provide an alert to staff members of the health care facility that the monitoring device has been tampered with. Preferably, the alert includes at least one of an audio alert and a visual alert, and also includes information pertaining to an identity of the resident with whom the monitoring device is associated and information pertaining to a last known location of the resident with whom the monitoring device is associated. Preferably, the computer subsystem is operative, responsive to receiving the tampering signal from the monitoring device, to instruct the door controllers associated with all the doors of the health care facility to employ the magnetic door locking mechanisms to lock the doors and to thereby prevent unauthorized exit of the resident from the health care facility.

Preferably, the computer subsystem is a portable computer subsystem. Preferably, at least one of the device detectors is integrated into the portable computer subsystem. Preferably, the multiplicity of device detectors are operative to wirelessly communicate with the monitoring devices. Preferably, the computer subsystem is also operative, responsive to a failure to communicate with one of the plurality of tamper-resistant resident monitoring devices, to alert the staff of the health care facility that the resident with whom the monitoring device is associated with is unaccounted for.

In accordance with a preferred embodiment of the present invention the wristband includes first and second wristband elements, a first end of the first wristband element is tamper-resistantly connected to one end of the monitoring portion, a first end of the second wristband element is tamper-resistantly connected to an opposite end of the monitoring portion, the second wristband element includes a buckle at a second end thereof for accommodating the first wristband element, the buckle includes a buckle pin for insertion to a selectable one of apertures formed in the first wristband element, and is thereby operable for interlinking the first and second wristband elements and the first and second wristband elements are tamper-resistantly locked together by at least one tamper-resistant pin which is irremovable engaged with a pin receiving element via at least one pin aperture formed in the second wristband element.

Preferably, the monitoring portion includes a distress button operable for signaling the computer subsystem that the resident with whom the monitoring device is associated with is in distress.

There is also provided in accordance with another preferred embodiment of the present invention a method for uniquely registering a resident of a health care facility including designating a tamper-resistant resident monitoring device to be associated with the resident, employing the device to send a first registration signal to a resident registration system, responsive to receiving the first registration signal, ascertaining that the device is not associated with a resident other than the resident, employing the resident registration system to associate the device with the resident, and employing the device to send a second registration signal to the resident registration system.

There is further provided in accordance with yet another preferred embodiment of the present invention a method for monitoring residents of a health care facility including uniquely associating each of a plurality of tamper-resistant resident monitoring devices with a different resident of the facility, providing a multiplicity of device detectors operative to communicate with the monitoring devices and communicating with the plurality of tamper-resistant resident monitoring devices via the multiplicity of device detectors, thereby monitoring the residents of the facility.

In accordance with a preferred embodiment of the present invention the monitoring includes monitoring the location of the residents. Preferably, the monitoring includes monitoring health-related parameters of the residents. Preferably, the health-related parameters include heart rate and blood oxygen levels.

Preferably, the monitoring devices are operable to be worn by the residents. Preferably, the method also includes controlling magnetic door locking mechanisms which are associated with doors of the facility. Preferably, the method also includes ascertaining whether a resident of the facility is authorized to open a particular door of the facility. Preferably, the method also includes locking or unlocking the doors responsive to the ascertaining whether a resident of the facility is authorized to open a particular door of the facility.

Preferably, the method also includes ascertaining whether a resident of the facility is authorized to operate any of the elevators of the health care facility and employing an elevator control system of the health care facility to prevent operating of the elevators by residents who are not authorized to operate the elevators. Preferably, the method also includes employing the elevator control system to allow operating of the elevators by residents who are not authorized to operate the elevators when the residents are accompanied by authorized personnel of the health care facility.

Preferably, the monitoring devices include a wristband and a monitoring portion. Preferably, the wristband is tamper-resistantly connected to the monitoring portion. Preferably, the wristband is formed of an electrically conductive material and is galvanically connected to the monitoring portion, thereby creating an electrical circuit through the wristband and the monitoring portion. Preferably, the electrically conductive material includes a conductive thermoplastic elastomer.

In accordance with a preferred embodiment of the present invention the method also includes, in response to breaching of the wristband or disconnecting of the wristband from the monitoring portion of the monitoring device, sending a tampering signal from said monitoring device via at least one of the device detectors, the tampering signal indicating that the monitoring device has been tampered with. Preferably, the method also includes, in response to breaching of the wristband or disconnecting of the wristband from the monitoring portion of the monitoring device, alerting the staff of the health care facility that the monitoring device has been tampered with.

Preferably, the alerting the staff of the health care facility includes providing at least one of an audio alert and a visual alert, and also includes providing information pertaining to an identity of the resident with whom the monitoring device is associated and information pertaining to a last known location of the resident with whom the monitoring device is associated. Preferably, the method also includes, in response to breaching of the wristband or disconnecting of the wristband from the monitoring portion of the monitoring device, providing instructions to the door controllers associated with all the doors of the health care facility to employ the magnetic door locking mechanisms to lock the doors and to thereby prevent unauthorized exit of the resident from the health care facility.

Preferably, the communicating includes wirelessly communicating. Preferably, the method also includes alerting the staff of the health care facility that a resident is unaccounted for, responsive to failure to communicate with a monitoring device associated therewith.

In accordance with a preferred embodiment of the present invention the wristband includes first and second wristband elements, a first end of the first wristband element is tamper-resistantly connected to one end of the monitoring portion, a first end of the second wristband element is tamper-resistantly connected to an opposite end of the monitoring portion, the second wristband element includes a buckle at a second end thereof for accommodating the first wristband element, the buckle includes a buckle pin for insertion to a selectable one of apertures formed in the first wristband element, and is thereby operable for interlinking the first and second wristband elements and the first and second wristband elements are tamper-resistantly locked together by at least one tamper-resistant pin which is irremovable engaged with a pin receiving element via at least one pin aperture formed in the second wristband element.

Preferably, the method also includes providing a distress button on the monitoring device, the distress button operable for signaling that the resident with whom the monitoring device is associated with is in distress.

BRIEF DESCRIPTION OF THE DRAWINGS

The present invention will be understood and appreciated more fully from the following detailed description, taken in conjunction with the drawings in which.

DETAILED DESCRIPTION

Figure 1A:
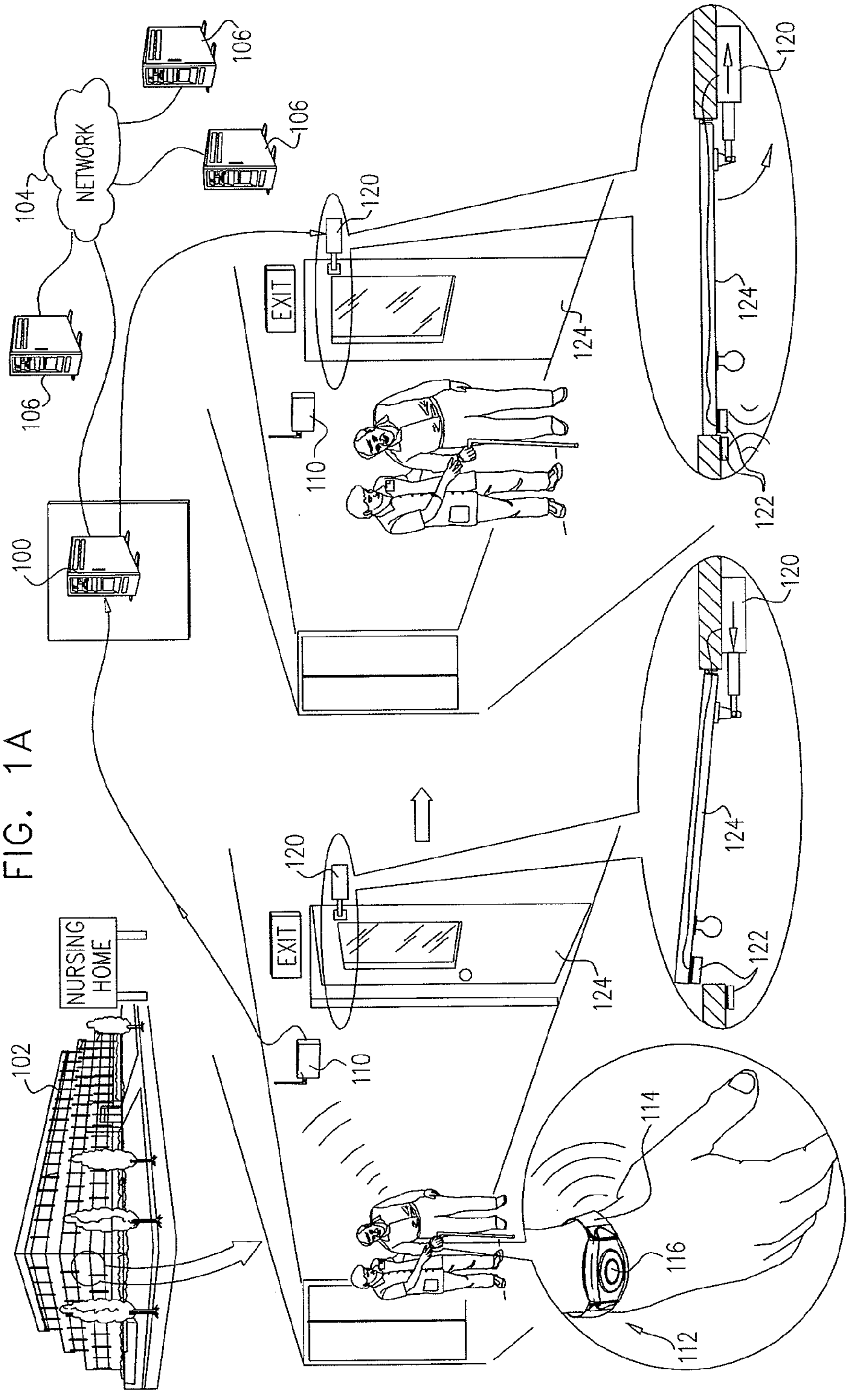
FIGS. 1A and 1B are simplified pictorial illustrations of a system for monitoring residents of a health care facility, constructed and operative in accordance with a preferred embodiment of the present invention.
Figure 1B:
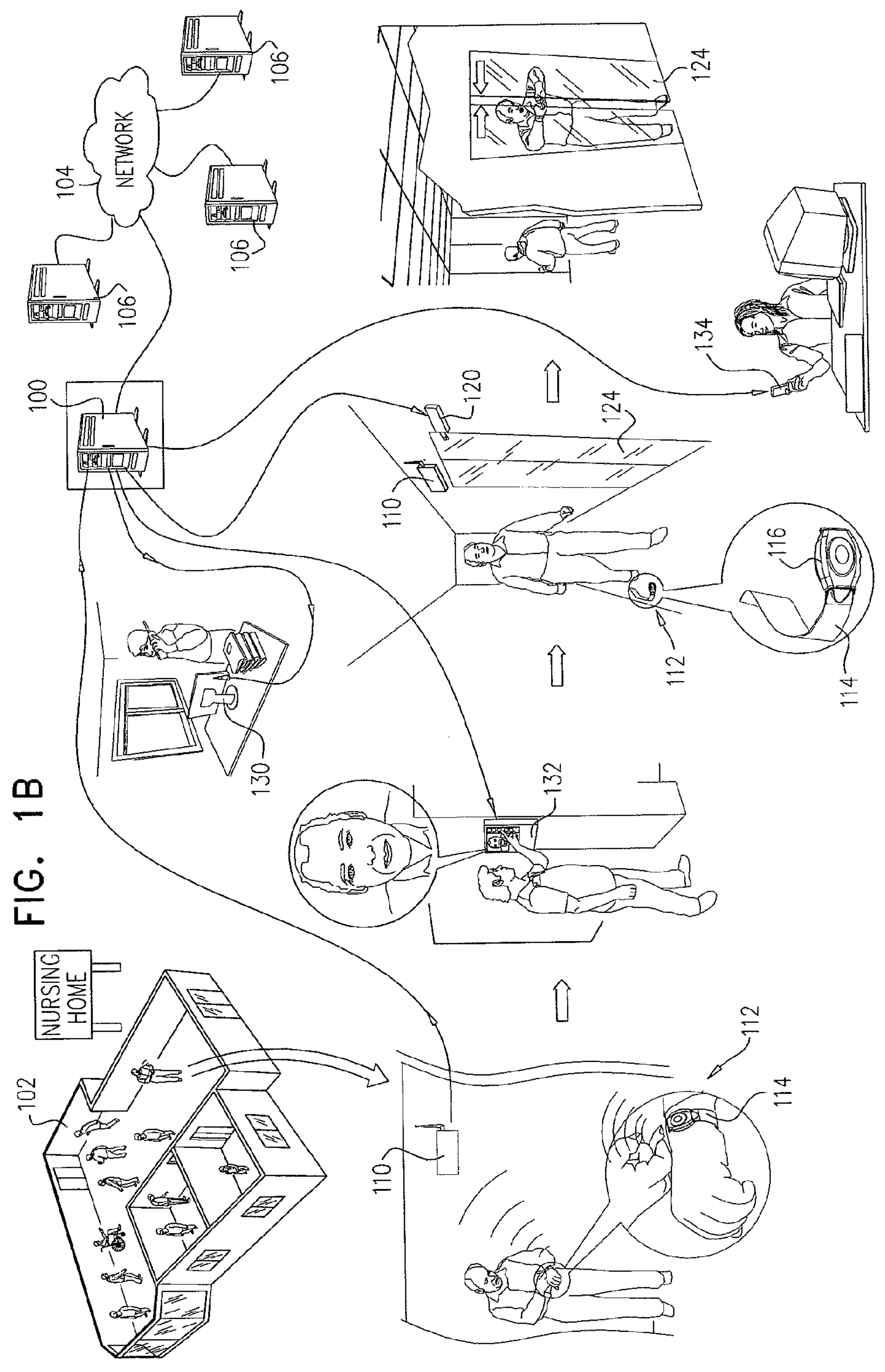

Reference is made to FIGS. 1A and 1B, which are simplified pictorial illustrations of a system for monitoring residents of a health care facility, constructed and operative in accordance with a preferred embodiment of the present invention. The system of FIGS. 1A and 1B preferably comprises a plurality of tamper-resistant resident monitoring devices, each of the devices being uniquely associated with a resident of the facility, a multiplicity of device detectors operative to communicate with the monitoring devices and a computer subsystem operative to communicate with the plurality of tamper-resistant resident monitoring devices via the multiplicity of device detectors, and to thereby monitor the residents of the facility. It is appreciated that the monitoring devices of FIGS. 1A & 1B are typically employed to monitor the whereabouts of residents of a health care facility, and may also be employed to monitor and report health-related parameters of the resident such as, for example, heart rate and blood oxygen levels.

As shown in FIG. 1A, the system resides on a server 100 located at a nursing home 102. Server 100 is preferably connected to an enterprise-wide network 104 that connects between similar servers 106 located at other health care facilities which maybe managed jointly with nursing home 102. A multiplicity of resident location detectors 110 are deployed throughout nursing home 102, which detectors 110 communicate with a plurality of tamper-resistant resident monitoring devices 112 and with server 100. Devices 112 are typically worn by each of the residents of nursing home 102, and preferably include a wristband 114 and a monitoring portion 116.

Door controllers 120 are provided for controlling magnetic door locking mechanisms 122 which are associated with doors 124 of nursing home 102. Locking mechanisms 122 are preferably operative to lock or unlock doors 124 responsive to signals received from server 100 via door controllers 120.

As seen in FIG. 1A, a resident of nursing home 102 wearing a monitoring device 112 approaches a door 124 which he is not authorized to open. A location detector 110 communicating with device 112 ascertains that the resident is in the vicinity of door 124 and communicates the location of the resident to server 100. Server 100 ascertains that the resident is not authorized to exit door 124, and therefore sends a signal to door controller 120 associated with door 124 instructing controller 120 to lock door 124.

As further shown in FIG. 1A, responsive to receiving the signal from server 100, controller 120 employs locking mechanism 122 to lock door 124, thereby preventing the resident from exiting door 124.

It is a particular feature of the present invention that wristband 114 is formed of an electrically conductive material such as, for example, KennElec 9719, commercially available from Kenner Material & System Co., Ltd. of Jhongli City, Taiwan. Wristband 114 is preferably galvanically connected to monitoring portion 116. Therefore, any breach of wristband 114 or disconnecting of wristband 114 from monitoring portion 116 causes the opening of an electrical circuit and is thereby operative to cause device 112 to signal that it has been tampered with.

Turning now to FIG. 1B, it is shown that a resident of nursing home 102 tampers with a device 112 which is fastened to his wrist, and succeeds in removing device 112 from his wrist by disconnecting wristband 114 of device 112 from monitoring portion 116. As seen in FIG. 1B, a detector 110 communicating with device 112 detects that device 112 has been tampered with, and sends a notification to server 100 notifying the system of the tampering. Responsive to the notification, server 100 preferably sends a multiplicity of alarm notifications to the staff of nursing home 102.

As shown in FIG. 1B, the alarm notifications include, for example, a message which is sent to a computer 130 of a staff member of nursing home 102, an alert which appears on a console 132 which is readily visible to staff members of nursing home 102, and a text message which is sent to a mobile device 134 of a staff member of nursing home 102. It is appreciated that the alerts may be, for example, any suitable combination of audio and visual alerts, and preferably include information pertaining to the identity of the resident and his last known location.

Additionally, server 100 preferably sends signals to door controllers 120 associated with all the doors 124 of nursing home 102 instructing controllers 120 to lock doors 124 and to thereby prevent unauthorized exit of the resident from nursing home 102.

Figure 2:
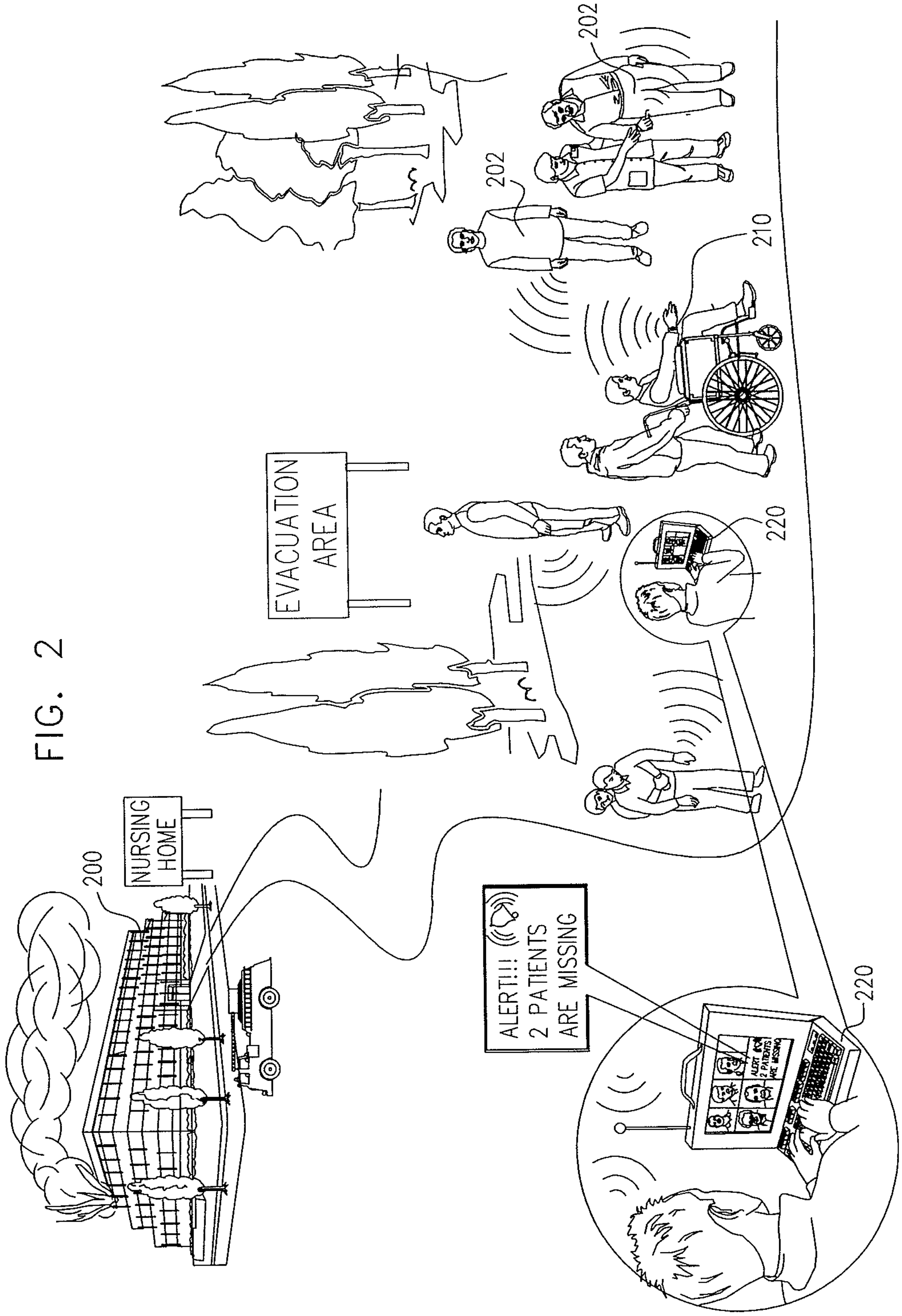
FIG. 2 is a simplified pictorial illustration of a system for monitoring whereabouts of residents of a health care facility, constructed and operative in accordance with another preferred embodiment of the present invention.

Reference is now made to FIG. 2, which is a simplified pictorial illustration of a system for monitoring whereabouts of residents of a health care facility, constructed and operative in accordance with another preferred embodiment of the present invention. The system of FIG. 2 preferably includes a plurality of tamper-resistant resident monitoring devices, each of the devices being uniquely associated with a resident of the facility and a computer system operative to communicate with the multiplicity of monitoring devices, and to thereby monitor the whereabouts of the residents.

As shown in FIG. 2, an emergency situation, such as a fire at a nursing home 200 forces residents 202 of nursing home 200 to evacuate nursing home 200 to an evacuation area outside of nursing home 200. Tamper-resistant resident monitoring devices 210 associated with each of residents 202 are preferably fastened to a wrist of each of residents 202 and preferably communicate resident whereabouts with a portable monitoring system 220. Communication between devices 210 and system 220 is typically of a wireless nature.

It is a particular feature of this embodiment of the present invention that each of devices 210 located within a predefined range from system 220 is operative to communicate with system 220 and to notify system 220 of the presence of the resident 202 associated therewith within the predefined range. Devices located outside of the predefined range from system 220 will fail to communicate with system 220, and residents associated therewith are therefore marked by system 220 as being unaccounted for. In the example of FIG. 2, two residents of nursing home 200 are reported by system 220 as being unaccounted for.

Figure 3A:
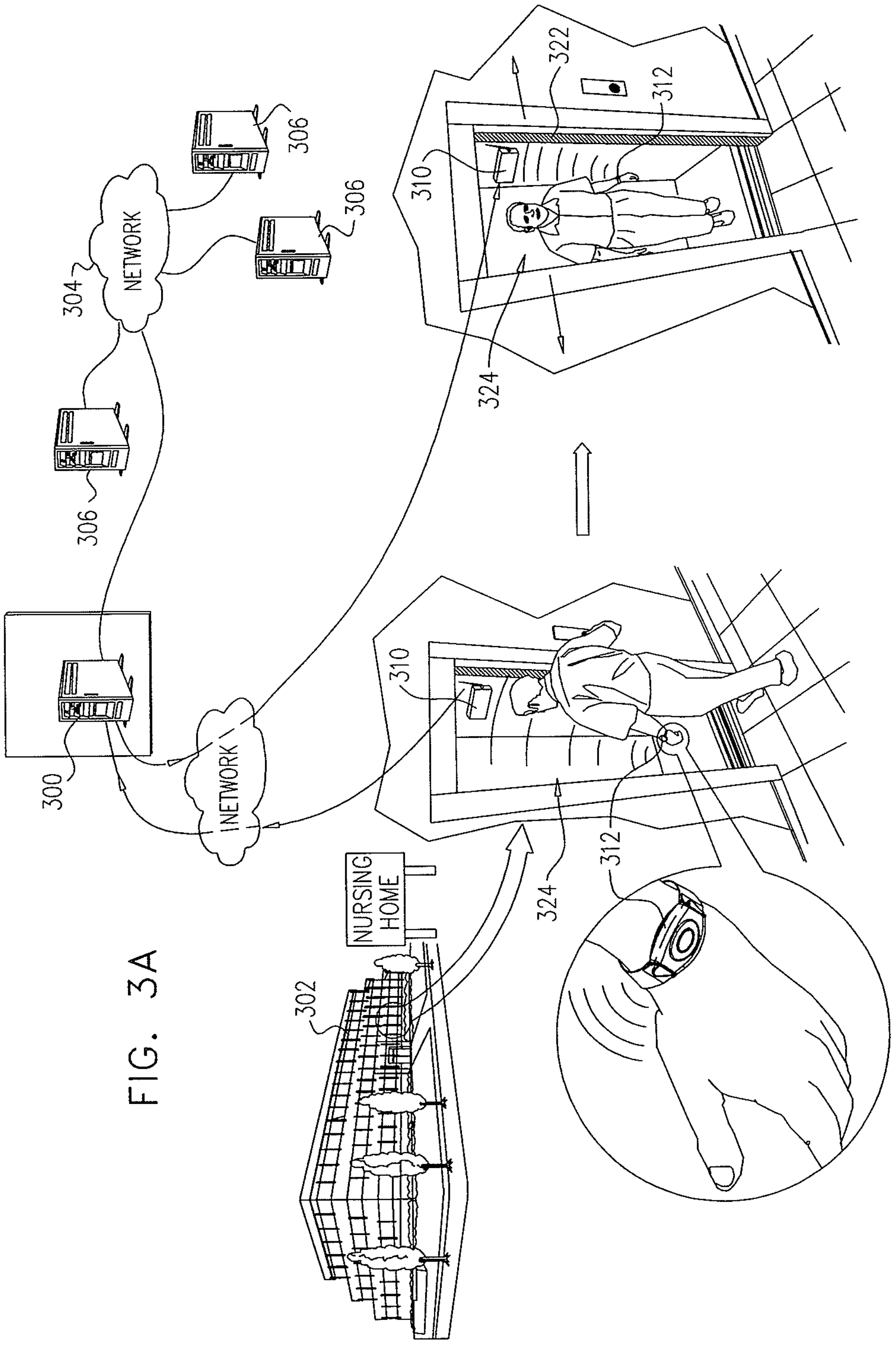
FIGS. 3A and 3B are simplified pictorial illustrations of a system for monitoring whereabouts of residents of a health care facility, constructed and operative in accordance with a further preferred embodiment of the present invention.
Figure 3B:
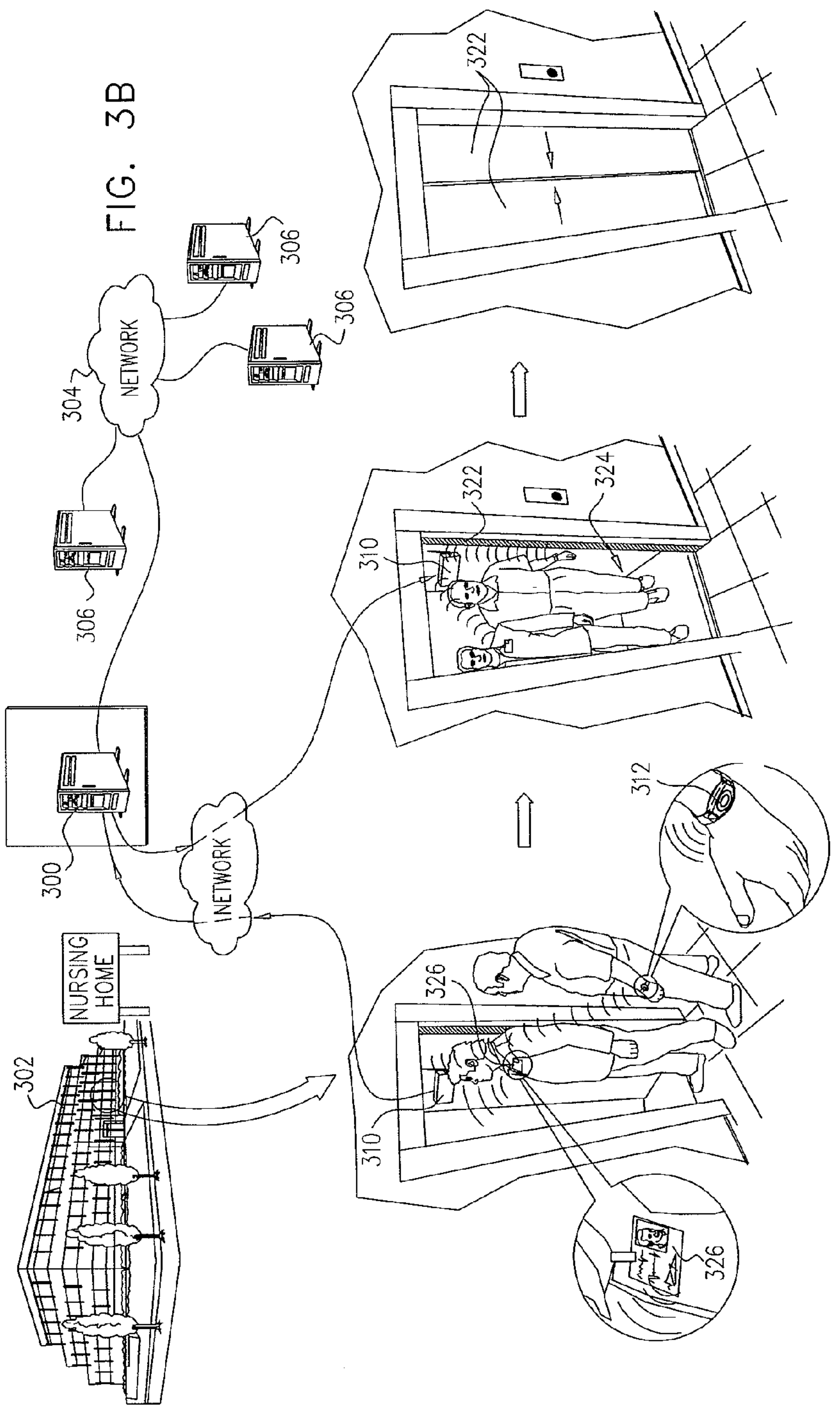

Reference is now made to FIGS. 3A and 3B, which are simplified pictorial illustrations of a system for monitoring whereabouts of residents of a health care facility, constructed and operative in accordance with a further preferred embodiment of the present invention. The system of FIGS. 3A and 3B preferably comprises a plurality of tamper-resistant resident monitoring devices, each of the devices being uniquely associated with a resident of the facility, a multiplicity of resident location detectors operative to communicate with the monitoring devices, and a computer system operative to communicate with the multiplicity of resident location detectors, and to thereby monitor the residents of the facility.

As shown in FIG. 3A, the system resides on a server 300 located at a nursing home 302. Server 300 is preferably connected to an enterprise-wide network 304 that connects between servers 306 located at other related health care facilities. A multiplicity of resident location detectors 310 are deployed throughout nursing home 302, which detectors 310 communicate with a plurality of tamper-resistant resident monitoring devices 312 and with server 300. Devices 312 are typically worn by each of the residents of nursing home 302.

Server 300 also preferably communicates with a central elevator control system of nursing home 302, and is operative to thereby control elevator doors 322 of elevators 324, in particular to prevent the closing of elevator doors 322 when a resident who requires accompaniment when riding an elevator 324 enters an elevator 324 without suitable accompaniment.

As shown in FIG. 3A, a resident of a nursing home 302 wearing a monitoring device 312 enters an elevator 324. A location detector 310 located inside elevator 324 and communicating with device 312 ascertains that the resident has entered elevator 324 and communicates the presence of the resident in elevator 324 to server 300. Server 300 ascertains that the resident is currently the sole occupant of elevator 324 and that he is not authorized to ride elevator 324 without suitable accompaniment. Server 300 therefore sends a signal to the central elevator control system of nursing home 302 instructing the central elevator control system to prevent closure of elevator doors 322.

Turning now to FIG. 3B, it is shown that a resident of nursing home 302 wearing a monitoring device 312 enters elevator 324 together with a member of the nursing home staff who is wearing an electronic tag 326. A location detector 310 located in elevator 324 and communicating with device 312 ascertains that the resident has entered elevator 324 and communicates the presence of the resident in elevator 324 to server 300. Location detector 310 also ascertains that the staff member has entered elevator 324 and communicates the presence of the staff member to server 300.

Server 300 ascertains that the resident is currently accompanied by the staff member and is therefore authorized to ride elevator 324. Server 300 therefore sends a signal to the central elevator control system of nursing home 302 instructing the central elevator control system to allow closure of elevator doors 322.

Figure 4A:
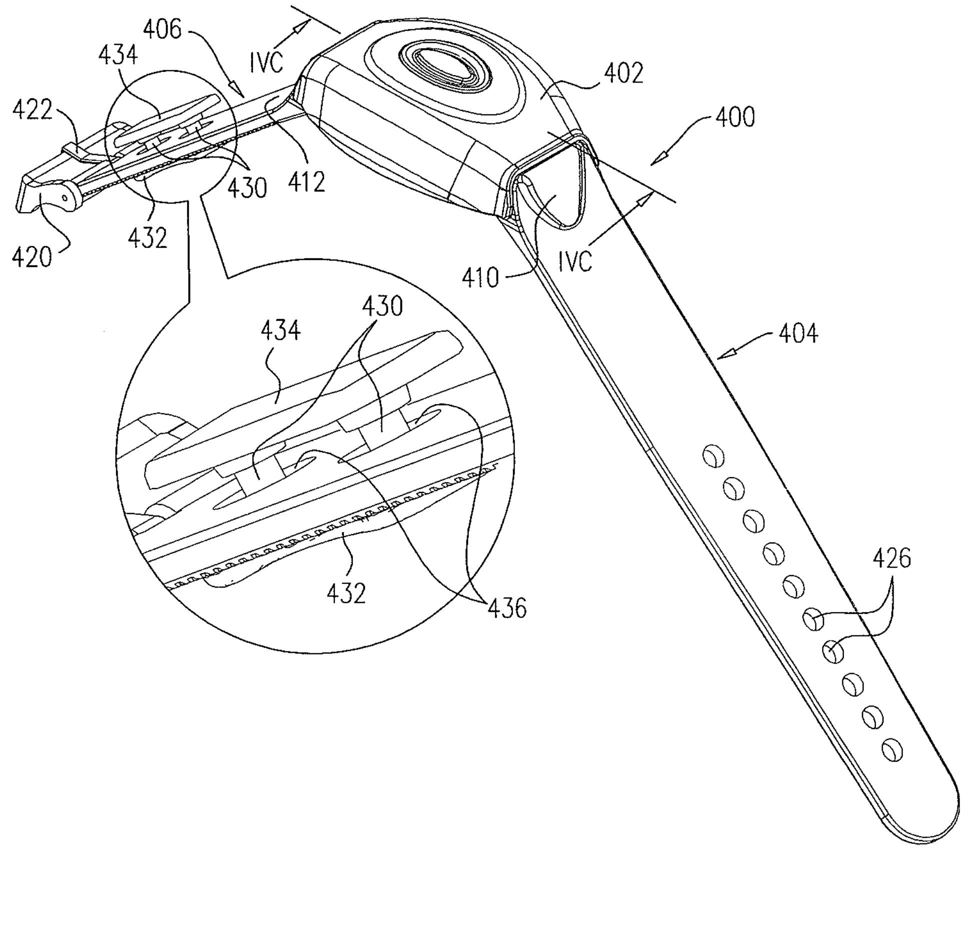
FIG. 4A is a simplified pictorial illustration of a tamper-resistant monitoring device which is part of the system of FIGS. 1A-3B.

Reference is now made to FIG. 4A, which is a simplified pictorial illustration of a tamper-resistant monitoring device which is part of the system of FIGS. 1A-3B. The tamper-resistant monitoring device is typically tamper-resistantly fastened about a wrist of an individual being monitored.

As shown in FIG. 4A, a tamper-resistant monitoring device 400 comprises a monitoring portion 402 and first and second wristband elements 404 and 406. A first end 410 of first wristband element 404 is tamper-resistantly connected to one end of monitoring portion 402 and a first end 412 of second wristband element 406 is tamper-resistantly connected to an opposite end of monitoring portion 402.

A buckle 420 is provided at a second end of second wristband element 406 for accommodating wristband element 404. Buckle pin 422 of buckle 420 is provided for insertion to a selectable one of apertures 426 formed in wristband element 404, and is thereby operable for interlinking first and second wristband elements 404 and 406. It is appreciated that the first and second wristband elements 404 and 406 are typically interlinked about the wrist of the individual being monitored.

Two tamper-resistant pins 430 are preferably provided for irremovable snap-in engagement with pin receiving element 432. As shown in FIG. 4A, pins 430 are preferably interconnected by pin connecting element 434 located on an outer surface of wristband element 406 and preferably protrude through two pin apertures 436 formed in wristband element 406 to an inner surface of wristband element 406. Pins 430 are preferably inserted through two of apertures 426 of wristband element 404 upon insertion thereof through buckle 420, and are then irremovably inserted into pin receiving element 432. It is appreciated that the snap engagement of pins 430 with receiving element 432 via second and first wristband elements 406 and 404 provides a locking mechanism which is operative to lock wristband elements 404 and 406 together about a wrist of an individual.

It is a particular feature of the present invention that wristband elements 404 and 406 are formed of an electrically conductive material such as, for example, KennElec 9719, commercially available from Kenner Material & System Co., Ltd. of Jhongli City, Taiwan, and are galvanically connected to monitoring portion 402. Therefore, breaching of wristband elements 404 and 406, disconnecting either of wristband elements 404 and 406 from monitoring portion 402, or disengagement of pins 430 from receiving element 432 causes the opening of an electrical circuit and is thereby operative to cause device 400 to signal that it has been tampered with.

Figure 4B:
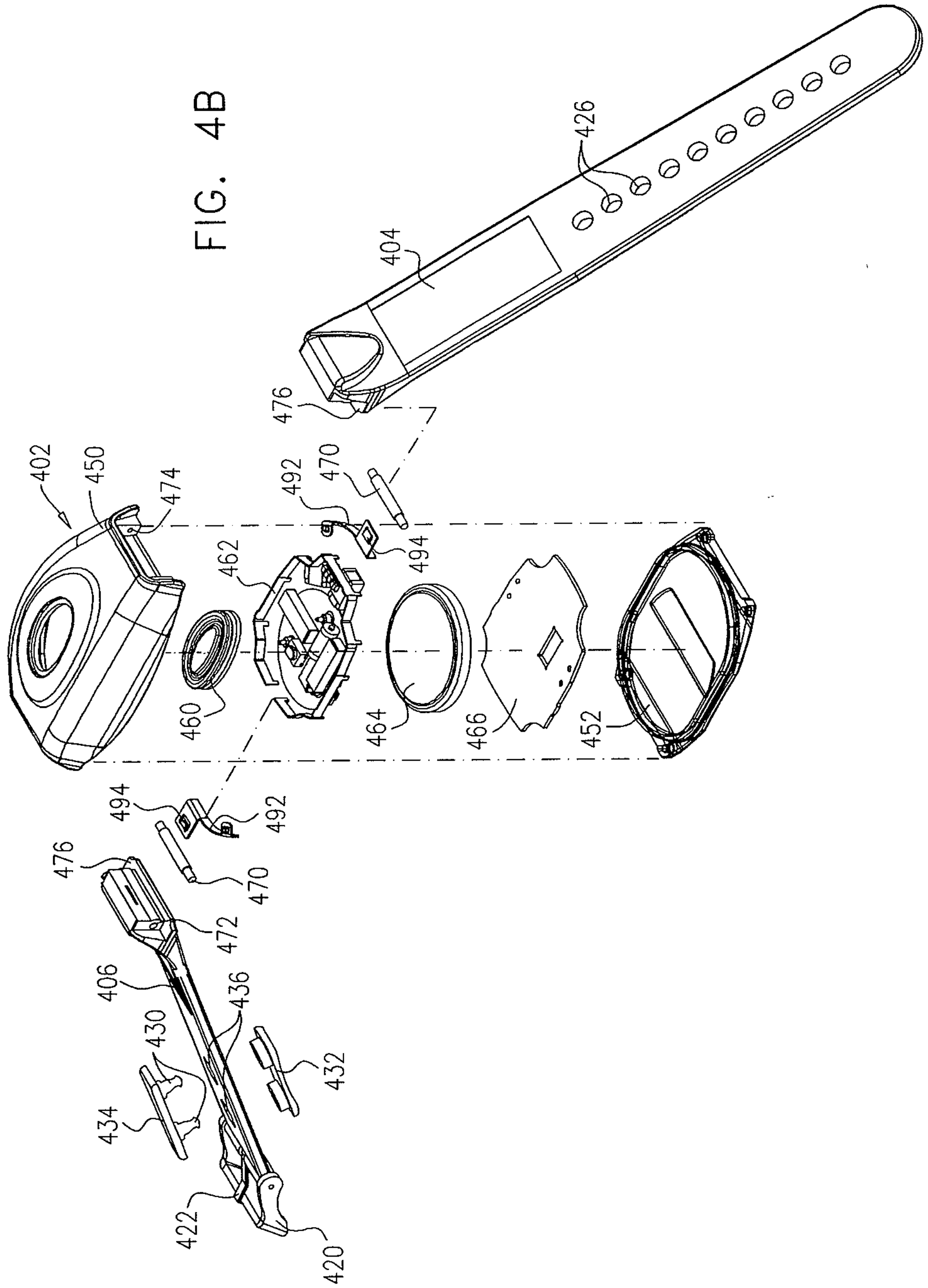
FIG. 4B is a simplified exploded view illustration of the tamper-resistant monitoring device of FIG. 4A.

Reference is now made to FIG. 4B, which is a simplified exploded view illustration of the tamper-resistant monitoring device 400 of FIG. 4A. As shown in FIG. 4B, monitoring portion 402 comprises interconnecting top and bottom housing elements 450 and 452. Housing elements 450 and 452 preferably houses a distress button 460, a distress button circuit board 462, a battery 464, and a main circuit board 466.

Spring rods 470 are preferably inserted through bores 472 formed in first and second wristband elements 404 and 406 and into recesses 474 formed in top housing element 450, thereby interconnecting wristband elements 404 and 406 and top housing element 450. Protrusions 476 which are formed in wristband elements 404 and 406 are operative to retain bottom housing element 452 in tight engagement with top housing element 450 upon interconnecting wristband elements 404 and 406 with top housing element 450 using spring rods 470.

Tamper-resistant battery mounting brackets 492 are provided for retaining battery 464. Each of brackets 492 are preferably formed with a resilient retaining flap 494.

Figure 4C:
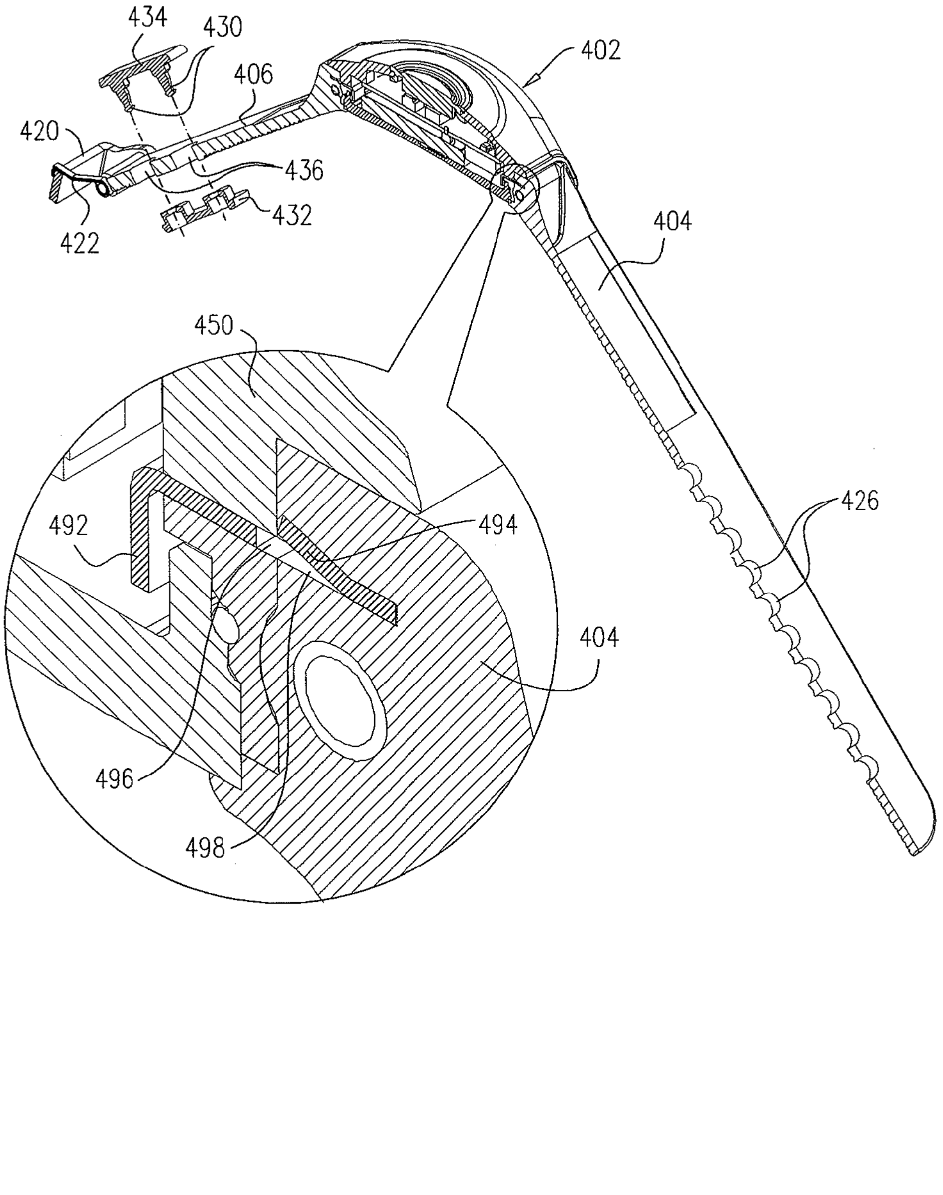
FIG. 4C is a sectional illustration taken along line IVC-IVC in FIG. 4A.

Reference is now made to FIG. 4C, which is a sectional illustration taken along lines IVC-IVC in FIG. 4A. As shown in FIG. 4C, tamper-resistant battery mounting brackets 492 are tightly inserted into recess 496 formed in housing portion 450 and into recesses 498 formed in wristband elements 404 and 406. As seen in FIG. 4C, recesses 496 and 498 are at least partially mutually aligned.

Upon insertion into recesses 498, resilient retaining flaps 494 of brackets 492 are preferably lodged into an upper portion of recesses 498 which portion is not aligned with recesses 496, thereby preventing removal of brackets 492 from recesses 496 and 498, and thereby tamper-resistantly locking wristband elements 404 and 406 to monitoring portion 402. It is appreciated that brackets 492 provide a galvanic link between wristband elements 404 and 406 and monitoring portion 402.

It is a particular feature of the present invention that brackets 492 are lodged into recess 498 and are thereby tightly retained in wristband elements 404 and 406. This feature is operative to guarantee that upon attempting to disconnect either of wristband elements 404 and 406 from monitoring portion 402, at least one of flaps 494 will be torn from corresponding bracket 492, thereby disconnecting the galvanic link between wristband elements 404 and 406 and monitoring portion 402, and thereby opening an electrical circuit embodied therewithin. The opening of the electrical circuit is operative to create an electronic signal notifying of the disconnecting of either of wristband elements 404 and 406. This electronic signal is then preferably transmitted by main circuit board 466 to an external monitoring receiver, such as location detectors 110 of FIGS. 1A & 1B.

Figure 5A:
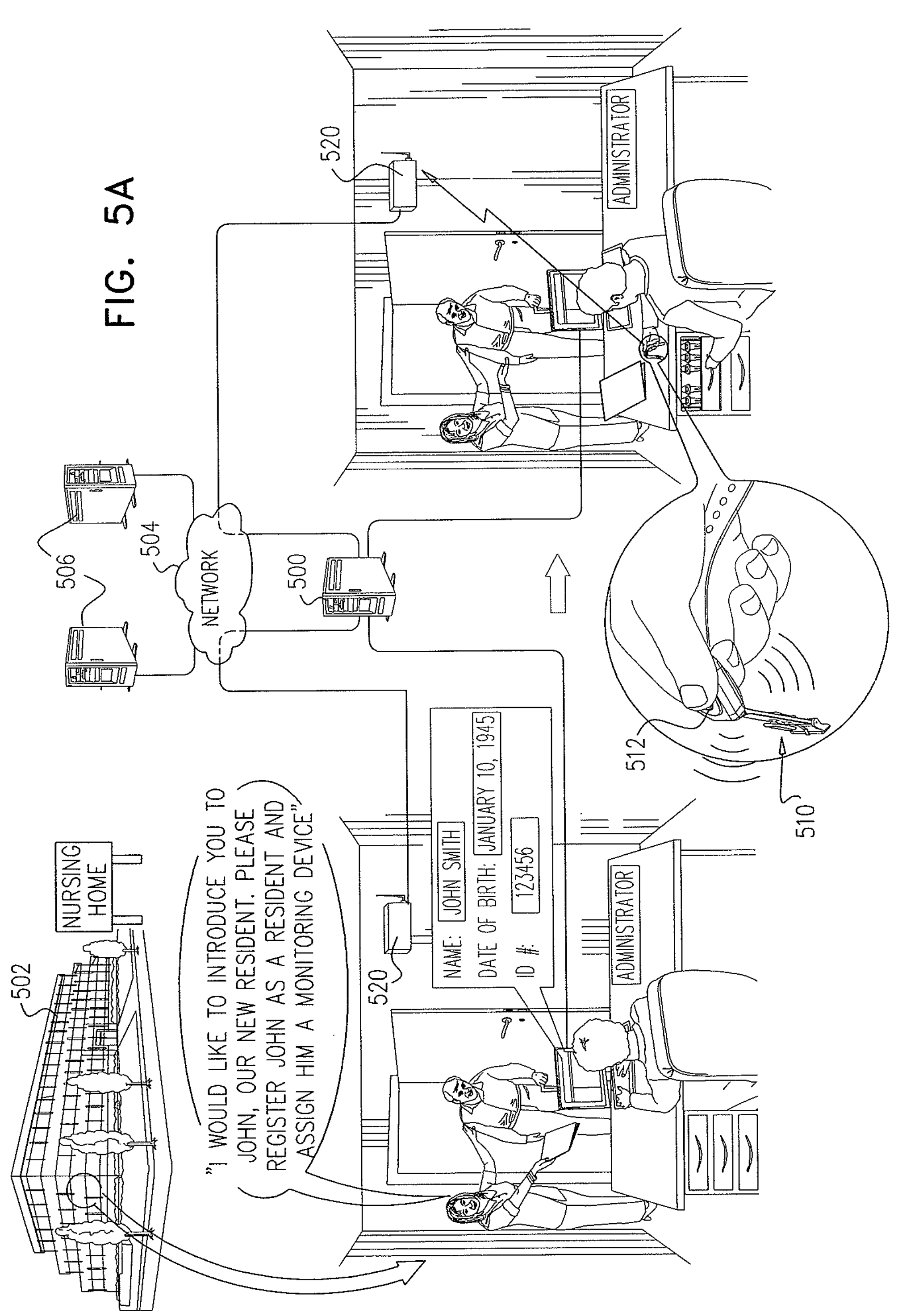
FIGS. 5A and 5B are simplified pictorial illustrations of the operation of the system of FIGS. 1A-4C in registering a new resident at a health care facility.
Figure 5B:
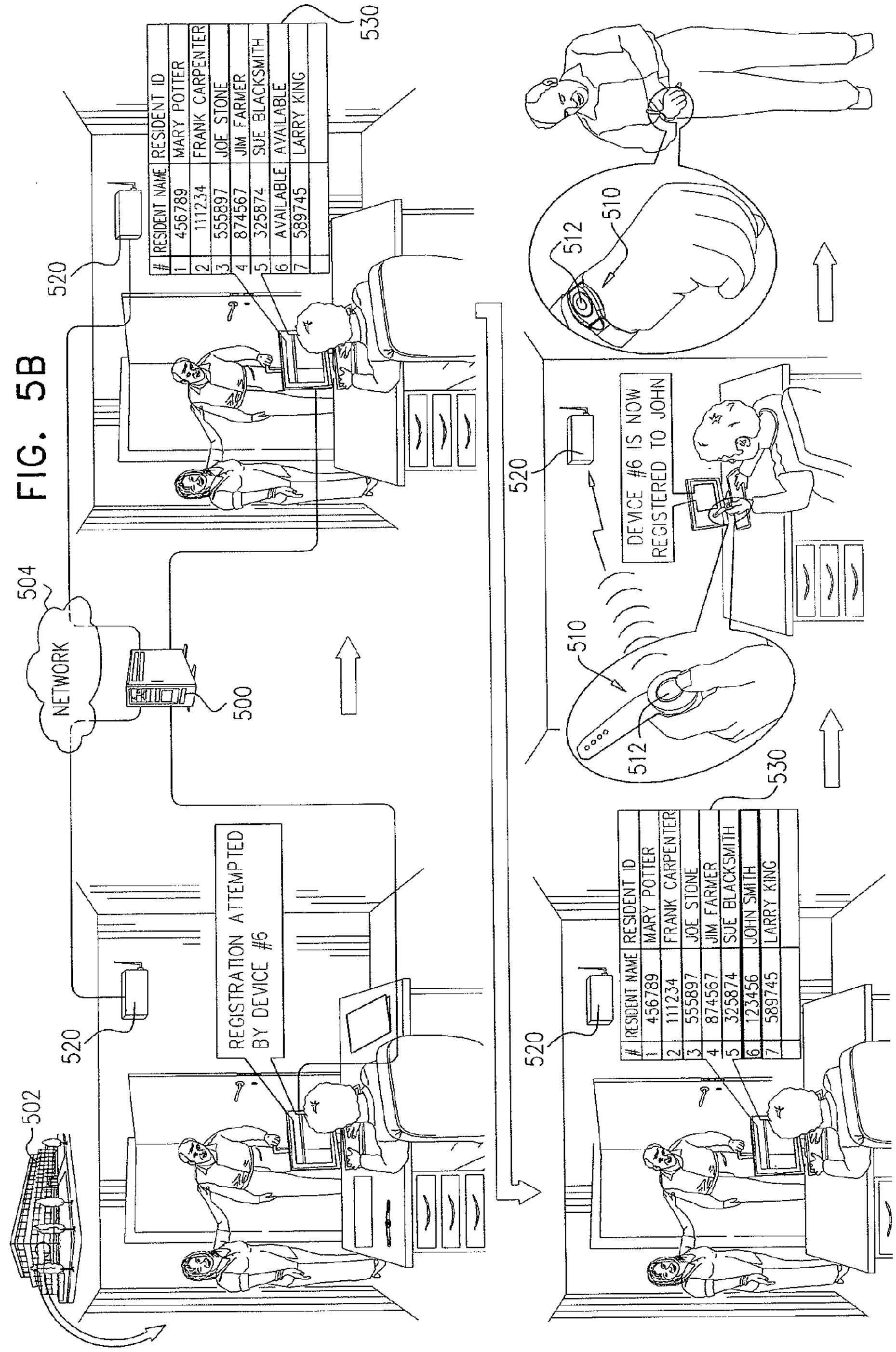

Reference is now made to FIGS. 5A and 5B, which are simplified pictorial illustrations of the operation of the system of FIGS. 1A-4C in registering a new resident at a health care facility. The system preferably resides on a server 500 located at a nursing home 502. Server 500 is preferably connected to an enterprise-wide network 504 which preferably connects between servers 506 located at other related health care facilities. It is appreciated that the registration of a resident at the health care facility includes, inter alia, registering a monitoring device to the resident. It is imperative that each monitoring device be uniquely assigned to one particular resident.

As shown in FIG. 5A, John, a new resident at nursing home 502, is introduced to an administrator of nursing home 502. The administrator initially records John's personal details, such as John's full name, date of birth, and an identification number on the system. The identification number may be any unique identification number, such as a U.S. Social Security number.

As further shown in FIG. 5A, the administrator then selects a monitoring device 510 and attempts to register device 510 in the system by first pressing a registration button 512 on device 510. A first registration signal is then emitted by device 510 and received by at least one of location detectors S20 which are mounted throughout nursing home 502 and which are connected to the system residing on server 500.

Turning now to FIG. 5B, it is shown that upon receiving the first registration signal, the system notifies the administrator that registration of a particular monitoring device having a particular serial number, such as #6, has been attempted. The administrator then reviews a device registration table 530 provided by the system to verify that device #6 is not registered to any other resident of nursing home 502 or any other related health care facilities. Upon verifying that device #6 is available, the administrator assigns device #6 to John by entering John's personal details into table 530.

To complete the registration process of device 510 to John, the administrator once again presses registration button 512 on device 510. A second registration signal is then emitted by device 510 and received by at least one of location detectors 520 which are mounted throughout nursing home 502 and which are connected to the system residing on server 500. Upon receiving the second registration signal, the system notifies the administrator that registration of monitoring device #6 to John has been completed.

It is a particular feature of the present invention that the registration process described hereinabove, by which the assignment of a monitoring device to a resident is coupled with physical registration signals that are emitted by the device and received by the system, is operative to guarantee that each monitoring device be uniquely assigned to one particular resident.

It is appreciated that upon discharge of a resident from nursing home 502, the resident's details are deleted from table 530, thereby making the device registered to the discharged resident available for reassignment to a new resident.

Figure 6:
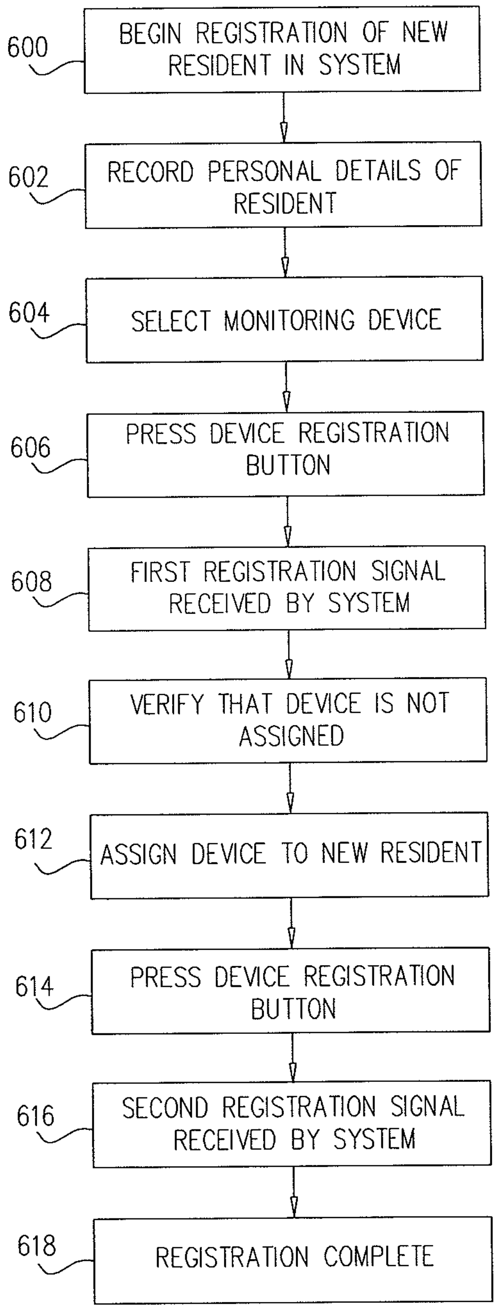
FIG. 6 is a simplified flowchart indicating steps in the execution of a method for uniquely registering a resident of a health care facility which employs the system of FIGS. 1A-4C.

Reference is now made to FIG. 6, which is a simplified flowchart indicating steps in the execution of a method for uniquely registering a resident of a health care facility which employs the system of FIGS. 1A-4C. The method of FIG. 6 preferably includes designating a tamper-resistant resident monitoring device to be associated with the resident, employing the device to send a first registration signal to a resident registration system, responsive to receiving the first registration signal, ascertaining that the device is not associated with a resident other than the resident, employing the resident registration system to associate the device with the resident and employing the device to send a second registration signal to the resident registration system.

As shown in FIG. 6, upon initializing the registration process of a new resident in step 600, the personal details of the new resident are typically entered into the system in step 602. A monitoring device is then selected in step 604 to be registered to the new resident. To initiate the registration of the device to the new resident, a registration button on the selected device is pressed in step 606, resulting in a first registration signal being emitted from the device and received by the system in step 608.

Thereafter, in step 610, it is verified that the device is not registered to any other resident. If the device is not registered to any other resident, the device is assigned to the new resident in step 612. Thereafter, in step 614, the device registration button is pressed once again, resulting in a second registration signal being emitted from the device and received by the system in step 616, thereby completing the registration of the device to the new resident in step 618.

It will be appreciated by persons skilled in the art that the present invention is not limited by what has been particularly shown and described hereinabove. Rather the scope of the present invention includes both combinations and subcombinations of the various features described hereinabove as well as modifications thereof which would occur to persons skilled in the art upon reading the foregoing description and which are not in the prior art.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

The invention claimed is:

1. A system preventing operation of an elevator by unauthorized users, the system comprising:

monitoring devices having wireless communication capability and configured to be worn by unauthorized users that are not authorized to ride an elevator without accompaniment by an authorized user;

electronic tags having wireless communication capability and configured to be worn by authorized users;

at least one location detector having wireless communication capability localized to an elevator area and configured to:

detect the presence of an unauthorized user by wireless communication with at least one of the monitoring devices located within said elevator area, and ascertain the presence of an authorized user by wireless communication with at least one of the electronic tags located within said elevator area; and a control system coupled to said at least one location detector and to said elevator, said control system being configured to allow, upon detection of the presence of the unauthorized user, operation of the elevator if and only if the presence of the authorized user is also ascertained to be accompanying the unauthorized user.

2. The system of claim 1, wherein said elevator operation includes allowing closure of a door of the elevator.

3. The system of claim 1, wherein the unauthorized user is a resident of a healthcare facility, and the authorized user is a staff member of the healthcare facility.

4. The system of claim 1, wherein the control system is a computer server that is coupled to the elevator, wherein the operation of the elevator is controlled by the server by sending a signal from the computer server to the elevator to operate the elevator in accordance therewith.

5. A method preventing operation of an elevator by unauthorized users in a facility that accommodates (a) unauthorized users that wear monitoring devices having wireless communication capability, the unauthorized users are not authorized to ride the elevator without accompaniment by an authorized user, and (b) authorized users, which selectably accompany unauthorized users, and wear electronic tags having wireless communication capability, the method comprising:

detecting the presence of an unauthorized user at an elevator location by wireless communication with a monitoring device;

ascertaining the presence of an authorized user at said elevator location by wireless communication with an electronic tag;

processing, with a computer system coupled to said elevator, results from said detecting and ascertaining; and responsive to the processing and if said detecting is positive, controlling, via the computer system, the elevator to allow operation thereof if and only if said ascertaining is also positive.

6. The method of claim 5, wherein said allowing operation includes allowing closure of a door of the elevator.

7. The method of claim 5, wherein the unauthorized user is a resident of a healthcare facility, and the authorized user is a staff member of the healthcare facility.

8. A system preventing operation of an elevator by unauthorized residents in a facility that accommodates residents and staff members, at least some residents being unauthorized to ride the elevator without accompaniment by a staff member, the system comprising:

monitoring devices configured to be worn by unauthorized residents, each of the monitoring devices including a wireless communication device;

electronic tags configured to be worn by staff members, each of the electronic tags including a wireless communication device;

at least one location detector having wireless communication capability within an elevator and configured to:

detect, based on wireless communication with the wireless communication device of a monitoring device, whether an unauthorized resident is located in the elevator, and ascertain, based on wireless communication with the wireless communication device of an electronic tag, whether a staff member is located in the elevator with the unauthorized resident; and a control system coupled to said at least one location detector and to said elevator, said control system configured to allow, when said detection of an unauthorized resident in the elevator is positive, operation of the elevator if and only if said ascertainment of the presence of a staff member in the elevator is also positive.

9. The system of claim 8, wherein said allowed operation includes allowing closure of a door of the elevator.

10. A method preventing operation of an elevator by unauthorized users in a facility that accommodates residents wearing monitoring devices and staff members wearing electronic tags, and wherein at least some residents are unauthorized to ride the elevator without accompaniment by a staff member, the method comprising:

detecting, based on wireless communication with a monitoring device, whether an unauthorized resident is located in an elevator;

ascertaining, based on wireless communication with an electronic tag, whether a staff member is located in the elevator with the unauthorized resident; and responsive to detection of the unauthorized resident in the elevator, sending a control signal from an electronic control system to the elevator to allow operation of the elevator if and only if said ascertaining of the presence of a staff member is positive.

11. The method of claim 10, wherein the operation of the elevator includes allowing closure of a door of the elevator.

* * * * *